United States Patent [19]
Iwatani

[11] Patent Number: 6,140,915
[45] Date of Patent: Oct. 31, 2000

[54] ALARM APPARATUS FOR VEHICLE-ONBOARD AC GENERATOR

[75] Inventor: Shiro Iwatani, Tokyo, Japan

[73] Assignee: Mitsubishi Denki Kabushiki Kaisha, Tokyo, Japan

[21] Appl. No.: 09/442,640

[22] Filed: Nov. 18, 1999

[30] Foreign Application Priority Data

Jul. 5, 1999 [JP] Japan ................................ 11-190110

[51] Int. Cl.⁷ .................................................. B60Q 1/00
[52] U.S. Cl. ........................ 340/438; 340/436; 340/455; 340/660; 340/662; 322/28; 322/99
[58] Field of Search ..................... 340/455, 636, 340/660, 661, 662, 663, 664; 322/99, 28, 90; 320/2, 65, 48

[56] References Cited

U.S. PATENT DOCUMENTS

| | | | |
|---|---|---|---|
| 4,342,022 | 7/1982 | Nichol | 340/455 |
| 4,362,983 | 12/1982 | Mori et al. | 322/28 |
| 4,415,848 | 11/1983 | Morishita | 322/32 |
| 4,435,676 | 3/1984 | Morishita | 322/33 |
| 4,471,287 | 9/1984 | Morishita et al. | 322/28 |
| 4,755,737 | 7/1988 | Komurasaki et al. | 322/99 |
| 4,812,732 | 3/1989 | Iwatani | 322/99 |
| 4,914,374 | 4/1990 | Iwatani et al. | 322/28 |
| 4,985,670 | 1/1991 | Kaneyuki et al. | 322/28 |
| 5,140,253 | 8/1992 | Itoh | 322/28 |
| 5,144,220 | 9/1992 | Iwatani et al. | 322/28 |
| 5,184,060 | 2/1993 | Iwatani | 322/99 |
| 5,184,109 | 2/1993 | Tanaka et al. | 340/455 |
| 5,245,267 | 9/1993 | Pierret et al. | 320/15 |
| 5,491,400 | 2/1996 | Iwatani et al. | 322/28 |
| 5,493,202 | 2/1996 | Iwatani et al. | 322/28 |
| 5,497,071 | 3/1996 | Iwatani et al. | 322/28 |
| 5,675,237 | 10/1997 | Iwatani | 322/28 |
| 5,923,095 | 7/1999 | Iwatani et al. | 307/10.1 |

FOREIGN PATENT DOCUMENTS

| | | |
|---|---|---|
| 335 085 | 10/1989 | European Pat. Off. . |
| 430 208 | 6/1991 | European Pat. Off. . |
| 4-96699 | 3/1992 | Japan ................ H02P 9/48 |

Primary Examiner—Jeffery A. Hofsass
Assistant Examiner—Phung Nguyen
Attorney, Agent, or Firm—Sughrue, Mion, Zinn, Macpeak & Seas, PLLC

[57] ABSTRACT

An alarm apparatus for a vehicle-onboard AC generator has an alarm function improved owing to detection of both output voltages of a pair of armature coils of the generator. The alarm apparatus includes an AC generator (1) driven by an engine of a motor vehicle and including a field coil (10) and a pair of armature coils (11, 12), a pair of rectifier circuits (21, 22; 21A, 22A) for rectifying output voltages generated by the paired armature coils (11, 12), respectively, a battery (5) charged by rectified outputs of the paired rectifier circuits (21, 22; 21A, 22A), a voltage regulator (3) for regulating the output voltages of the paired armature coils (11, 12) on the basis of either rectified output voltages of the rectifier circuits (21, 22; 21A, 22A) or a terminal voltage of the battery (5), and an alarm means (4A, 49) for generating an alarm when at least one of the output voltages of the paired armature coils (11, 12) deviates from a predetermined value (VR2).

10 Claims, 3 Drawing Sheets

ALARM APPARATUS FOR VEHICLE-ONBOARD AC GENERATOR

BACKGROUND OF THE INVENTION

1. Field of the Invention

The present invention relates to an alarm apparatus for indicating occurrence of abnormality in an alternating current generator mounted on a motor vehicle (hereinafter also referred to as the vehicle-onboard AC generator) which includes a pair of armature coils. More particularly, the invention is concerned with an alarm apparatus for a vehicle-onboard AC generator which apparatus can ensure an improved alarm function owing to a circuit arrangement for detecting the output voltage from each of the paired armature coils.

2. Description of Related Art

For a better understanding of the concept underlying the present invention, description will first be made of a hitherto known or conventional alarm apparatus for a vehicle-onboard AC generator which includes a pair of armature coils by reference to FIG. 3 which is a circuit diagram showing a structure of the conventional alarm apparatus.

Referring to FIG. 3, an AC generator 1 mounted on a motor vehicle (not shown) is adapted to be driven by an engine of the motor vehicle, i.e., vehicle-onboard engine (not shown either), and includes a field coil 10 and a pair of armature coils 11 and 12.

Each of the armature coils 11 and 12 of the AC generator 1 is constituted by three phase windings. Further, the armature coils 11 and 12 are disposed with a phase difference of e.g. 30° in terms of electrical angle relative to a field coil 10 for the purpose of suppressing ripple components of the output voltage of the AC generator as a whole.

A pair of rectifier circuits 21 and 22 are connected to the AC generator 1 so that output voltages generated by or induced in the armature coils 11 and 12, respectively, can undergo full-wave rectification.

Each of the rectifier circuits 21 and 22 is constituted by diode pairs (i.e., pairs of diodes) connected in parallel in correspondence to individual phase windings, respectively, of each of the armature coils 11 and 12.

Further, the rectifier circuits 21 and 22 are connected in parallel with each other and equipped with positive (plus) output terminals 21a and 22a located at the cathode side of the individual diode pairs and negative (minus) output terminals 21b and 22b at the anode side of the individual diode pairs.

A voltage regulator (VR) 3 connected to one end of the field coil 10 is comprised of a grounded-emitter power transistor 31 for regulating or adjusting a field current flowing through the field coil 10, a suppression diode 32 connected to the collector of the power transistor 31, and a comparator 33 for driving the power transistor 31 to ON-state (conducting state). The comparator 33 may be constituted by a differential amplifier known per se.

The comparator 33 has an inversion input terminal (−) to which a voltage appearing at the positive or plus output terminals 21a and 22a of the rectifier circuits (or voltage appearing at a plus electrode of a battery described hereinafter) is applied, while a comparison reference voltage VR1 is applied to the non-inversion input terminal (+) of the comparator 33.

Connected to one end of the armature coil 11 is an alarm circuit 4 which is comprised of a resistor 41 serving as a constant-voltage power source 40, a Zener diode 42 connected in series to the resistor 41, a grounded-emitter alarm output transistor 43 and a comparator 44 for driving the alarm output transistor 43 to ON-state (conductive state). The comparator 44 may equally be constituted by a differential amplifier known per se.

Further, the alarm circuit 4 includes a parallel circuit of a smoothing condenser 45 and a resistor 46 inserted between the inversion input terminal (−) of the comparator 44 and the ground potential, and a series circuit of a resistor 47 and a reverse-current blocking diode 48 inserted between the inversion input terminal (−) of the comparator 44 and the one end of the armature coil 11.

Additionally, the alarm circuit 4 includes an alarm indicator lamp 49 connected to the collector of the alarm output transistor 43. The alarm indicator lamp 49 is driven to the lit state (electrically energized state) when the alarm output transistor 43 is driven to the ON-state.

Applied to the inversion input terminal (−) of the comparator 44 is an output voltage from one end of the armature coil 11 by way of the resistor 47 and the reverse-current blocking diode 48, while applied to the non-inversion input terminal (+) of the comparator 44 is a comparison reference voltage VR2.

A battery 5 is adapted to be charged with the rectified output power fed from the positive (plus) output terminals 21a and 22a of the rectifier circuits and supply electric power to the AC generator 1, the voltage regulator (VR) 3 and the alarm circuit 4.

Inserted between the plus electrode of the battery 5 and the alarm circuit 4 is a key switch 6 which is turned on or closed upon starting of operation of the motor vehicle.

The voltage appearing at the plus electrode of the battery 5 is applied to the other end of the field coil 10 of the AC generator 1, the cathode of the suppression diode 32 which constitutes a part of the voltage regulator (VR) 3, the inversion input terminal (−) of the comparator 33 constituting another part of the voltage regulator (VR) 3, the resistor 41 of the alarm circuit 4 and the alarm indicator lamp 49, respectively.

The power transistor 31 of the voltage regulator (VR) 3 is turned on in response to the output of the comparator 33 when the rectified output voltages of the rectifier circuits 21 and 22 or the terminal voltage of the battery 5 is lower than the comparison reference voltage VR1 inclusive thereof, whereby the current flowing through the field coil 10 is so controlled by the voltage regulator (VR) 3 that the output voltages of the armature coils 11 and 12, respectively, are regulated to be equal to a level corresponding to the comparison reference voltage VR1.

On the other hand, the alarm output transistor 43 of the alarm circuit 4 is turned on when the output voltage appearing at one end of the armature coil 11 (i.e., voltage of one phase) becomes lower than the comparison reference voltage VR2 inclusive, whereby the alarm indicator lamp 49 is driven to the lit-state, i.e., alarm generating state.

Next, description will turn to operation of the conventional alarm apparatus for the vehicle-onboard AC generator shown in FIG. 3.

Immediately after the key switch 6 is turned on, operation of the vehicle engine is not started yet. Thus, the AC generator 1 is in the non-driven state. Consequently, no output voltage is generated by the armature coils 11 and 12.

Under the circumstances, the voltage applied to the inversion input terminal (−) of the comparator 44 of the alarm circuit 4 remains lower than the comparison reference voltage VR2 inclusive. Thus, the comparator 44 generates the comparison output of level "H".

As a result of this, the alarm output transistor 43 is turned on, whereby the alarm indicator lamp 49 is electrically energized to be lit.

When the power generation of the AC generator 1 is started in succession to the start of operation of the vehicle-onboard engine, the output voltage of the armature coils 11 and 12 rises or increases. When the voltage applied to the inversion input terminal (−) of the comparator 44 exceeds the comparison reference voltage VR2, the comparator 44 generates the output signal of level "L".

Consequently, the alarm output transistor 43 is turned off, whereby the alarm indicator lamp 49 is electrically deenergized, indicating that a normal power generation state is prevailing.

On the other hand, the voltage regulator (VR) 3 detects the terminal voltage of the battery 5 (or rectified output voltages of the rectifier circuits 21 and 22, respectively), to thereby perform on-off control of the power transistor 31 and hence the current flowing through the field coil 10 with the aid of the comparison output signal of the comparator 33 so that the output voltage of the AC generator 1 can be regulated to the level which coincide with the comparison reference voltage VR1.

In that case, a surge voltage may be induced in the field coil 10 due to on-off operation of the power transistor 31. However, such surge voltage can be absorbed by the suppression diode 32.

When the output voltage of the armature coils 11 and 12 lowers below the comparison reference voltage VR2 for some reason even in the normal operation state of the AC generator 1, the comparator 44 of the alarm circuit 4 generates the comparison output signal of level "H".

Consequently, the alarm output transistor 43 is turned on to thereby energize electrically the alarm indicator lamp 49, messaging an abnormal power generation state of the AC generator.

As is apparent from the foregoing, in the case of the conventional alarm apparatus for the vehicle-onboard AC generator known heretofore, the alarm circuit 4 is connected to only one of the paired armature coils (i.e., to the armature coil 11) for detecting the output voltage thereof. Consequently, it is impossible to detect the change or lowering of the output voltage of the other armature coil 12, giving rise to a problem that the alarm function for abnormal lowering of the generated voltage can not be ensured adequately.

SUMMARY OF THE INVENTION

In the light of the state of the art described above, it is an object of the present invention to provide an alarm apparatus for a vehicle-onboard AC generator whose alarm function is improved or enhanced by detecting both the output voltages of paired armature coils.

In view of the above and other objects which will become apparent as the description proceeds, there is provided according to an aspect of the present invention an alarm apparatus for a vehicle-onboard AC generator, which apparatus includes an AC generator driven by an engine of a motor vehicle and including a field coil and a pair of armature coils, a pair of rectifier circuits for rectifying output voltages generated by the paired armature coils, respectively, a battery charged by rectified outputs of the paired rectifier circuits, a voltage regulator for regulating the output voltages of the paired armature coils on the basis of either rectified output voltages of the rectifier circuits or a terminal voltage of the battery, and an alarm means for generating an alarm when at least one of the output voltages of the paired armature coils deviates from a predetermined value.

By virtue of the above-arrangement, the alarm generating function of the alarm apparatus for the vehicle-onboard AC generator can be improved owing to detection of both the output voltages of the paired armature coils, respectively, of the AC generator.

In a preferred mode for carrying out the invention, the alarm means may set a lower limit value of voltage generated by the AC generator as the predetermined value, and an alarm may be generated when at least one of the output voltages of the paired armature coils becomes lower than the lower limit value inclusive.

By virtue of the arrangement described above, the alarm performance of indicating poor electricity generation (an abnormality of the AC generator) can be improved.

In another preferred mode for carrying out the invention, the alarm means may be comprised of a pair of comparators for comparing the output voltages of the paired armature coils, respectively, with the predetermined value mentioned above, and an alarm indicator lamp actuated in dependence on a comparison output of at least one of the paired comparators.

With the arrangement mentioned above, the alarm function or performance of the alarm apparatus can be enhanced.

In yet another preferred mode for carrying out the invention, the output voltage of one of the paired armature coils may be applied to an inversion input terminal of one of the paired comparators, while the output voltage of the other one of the paired armature coils may be applied to a non-inversion input terminal of the other one of the paired comparators, and the output voltage of the other comparator may be applied to the inversion input terminal of the one comparator.

With the arrangement mentioned above, there can be realized the alarm apparatus of enhanced reliability without involving any appreciable increase in the manufacturing cost.

In still another preferred mode for carrying out the invention, the paired comparators may be so designed as to compare one-phase output voltages of the paired armature coils, respectively, with the predetermined value.

With the arrangement mentioned above, the alarm function or performance of the alarm apparatus can be enhanced.

In a further preferred mode for carrying out the invention, the paired comparators may be so designed as to compare output voltages at neutral points of the paired armature coils, respectively, with the predetermined value.

With the arrangement described above, the performance of the alarm apparatus can be enhanced even for the AC generator whose output current is large.

In a yet further preferred mode for carrying out the invention, the paired rectifier circuits may be connected in parallel to each other.

With the arrangement mentioned above, the performance of the alarm apparatus can be enhanced even for the AC generator of high output voltage.

In a still further preferred mode for carrying out the invention, the paired rectifier circuits may be connected in series to each other.

With the arrangement mentioned above, the performance of the alarm apparatus can be enhanced even for the AC generator of high output voltage.

In a preferred mode for carrying out the invention, the paired armature coils may be set to a same phase in terms of an electrical angle.

The arrangement mentioned above can equally ensure advantageous effects such as those described above.

In another preferred mode for carrying out the invention, a predetermined phase difference may be set between the paired armature coils in terms of an electrical angle.

By virtue of the above arrangement, there can be realized the alarm apparatus of improved performance even for the AC generator for which a ripple component suppressing circuitry is adopted.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
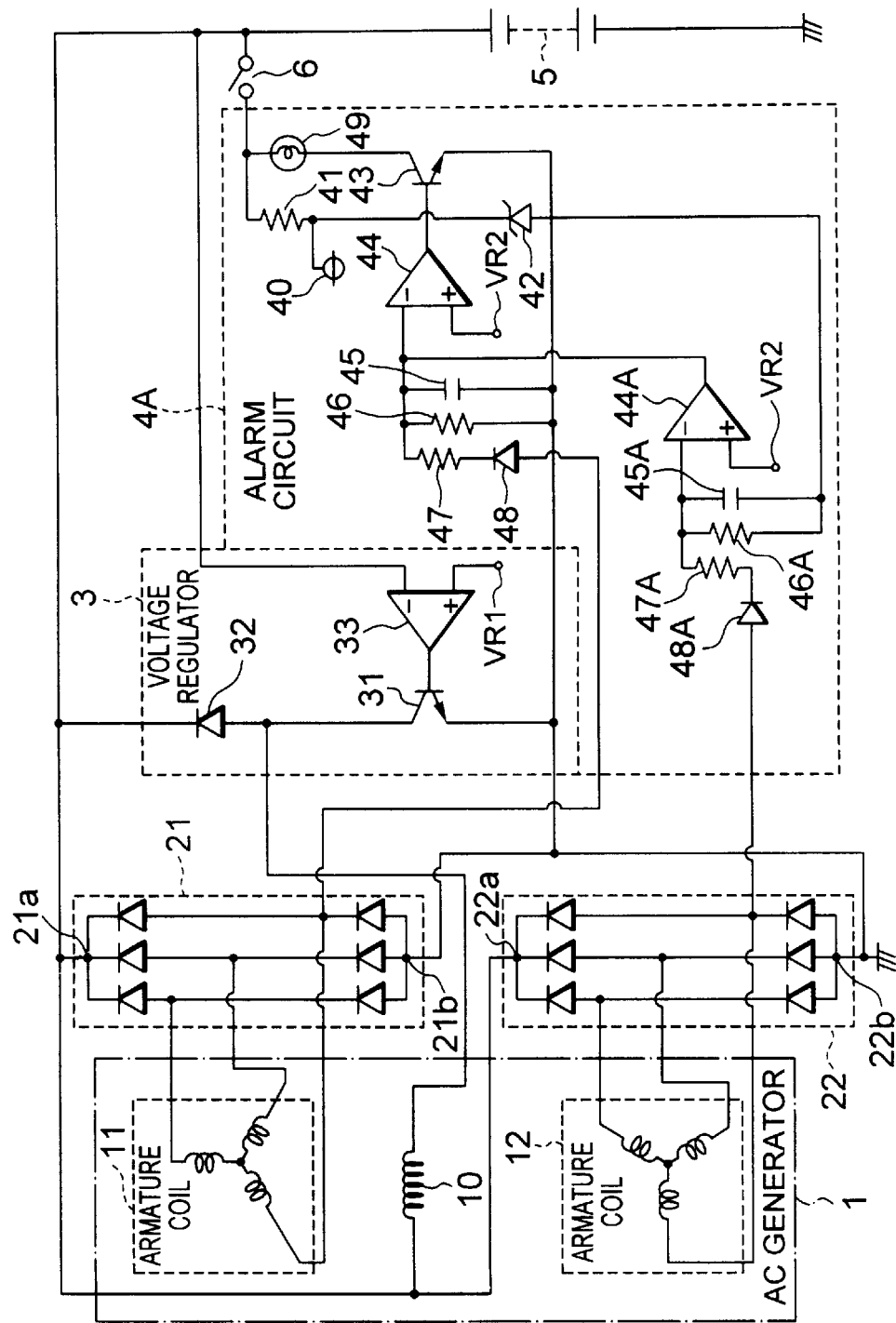
FIG. 1 is a circuit diagram showing a circuit configuration of an alarm apparatus for a vehicle-onboard AC generator according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Figure 3:
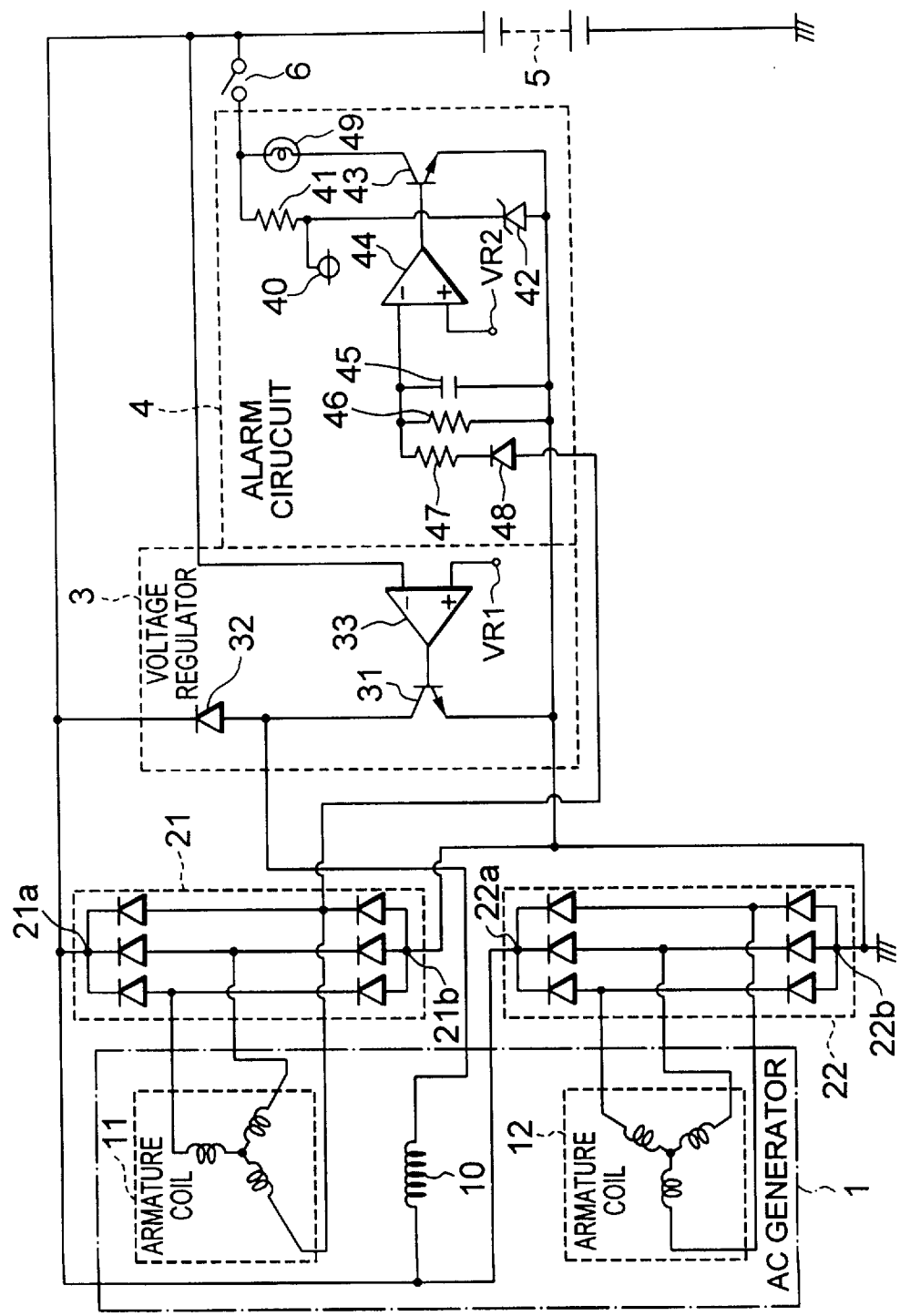
FIG. 3 is a circuit diagram showing a circuit configuration of a conventional alarm apparatus for a vehicle-onboard AC generator.

FIG. 1 is a circuit diagram showing a circuit configuration of the alarm apparatus for the vehicle-onboard AC generator according to a first embodiment of the present invention. In the figure, components same as or similar to those described hereinbefore by reference to FIG. 3 are denoted by like reference characters. Accordingly, repeated description of these components will be unnecessary.

As can be seen in FIG. 3, the alarm apparatus denoted generally by reference symbol 4A includes in addition to the components 40 to 49 mentioned hereinbefore a comparator 44A, a smoothing condenser 45A, resistors 46A and 47A and a reverse-current blocking diode 48A each of a same structure as the comparator 44, the smoothing condenser 45, the resistors 46 and 47 and the reverse-current blocking diode 48 mentioned hereinbefore, respectively.

In the arrangement described above, the output voltage of the armature coil 12 is applied to the inversion input terminal (−) of the comparator 44A via the resistor 47A and the reverse-current blocking diode 48A, while applied to the non-inversion input terminal (+) of the comparator 44A is the comparison reference voltage VR2 of the level mentioned previously.

The reverse-current blocking diode 48A has an anode which is connected to one end of the coil (other armature coil) 12 of the paired armature coils.

On the other hand, the output terminal of the comparator 44A (i.e., other comparator of the paired comparators 44 and 44A) incorporated in the alarm circuit 4A is connected to the inversion input terminal (−) of the one comparator 44 (corresponding to the comparator mentioned hereinbefore).

Next, description will be directed to the operation of the alarm apparatus for the vehicle-onboard AC generator shown in FIG. 1. Detection of the output voltage of the armature coil 11 and the alarm generating operation effectuated by one comparator 44 of the paired comparators included in the alarm circuit 4A are same as those in the conventional alarm apparatus described hereinbefore.

The other comparator 44A of the alarm circuit 4A serves for detecting the output voltage of the other armature coil 12 of the paired armature coils to thereby generate the comparison output of level "L" when the output voltage of the armature coil 12 is lower than the comparison reference voltage VR2 inclusive, while generating the comparison output of level "H" when the output voltage of the armature coil 12 exceeds the comparison reference voltage VR2.

Thus, even when the output voltage of the one armature coil 11 is at the sound level indicating soundness of the generator, abnormal lowering of the output voltage of the other armature coil 12 below the comparison reference voltage VR2 results in the output of level "L" of the comparator 44A. As a consequence, the voltage signal of level "L" is applied to the non-inversion input terminal (−) of the comparator 44.

Thus, the output of the comparator 44 assumes level "H", to thereby turn on the alarm output transistor 43, whereby the alarm indicator lamp 49 is electrically energized, indicating the abnormal lowering of the output voltage of the other armature coil 12.

As can now be understood from the above, by providing a pair of comparators 44 and 44A in parallel in correspondence to the output voltages of the paired armature coils 11 and 12, respectively, abnormal lowering of the ouput voltage in either one of the armature coil 11 or 12 can be detected, whereby alarm is generated. Thus, the reliability of the alarm function can be enhanced.

Further, owing to such arrangement that the output of the other comparator 44A is applied to the inversion input terminal (−) of the one comparator 44, the alarm output transistor 43 can be shared in common by the comparators 44A and 44, which in turn means that the circuit structure of the alarm circuit 4A can be simplified favorably to low-cost manufacturing of the alarm apparatus.

Embodiment 2

In the case of the alarm apparatus according to the first embodiment of the invention, the output voltage appearing at the neutral point of the armature coils 11 and 12 is not made use of as the rectified output. However, the output voltage at the neutral point of the armature coils 11 and 12 may be utilized as the rectified output.

Figure 2:
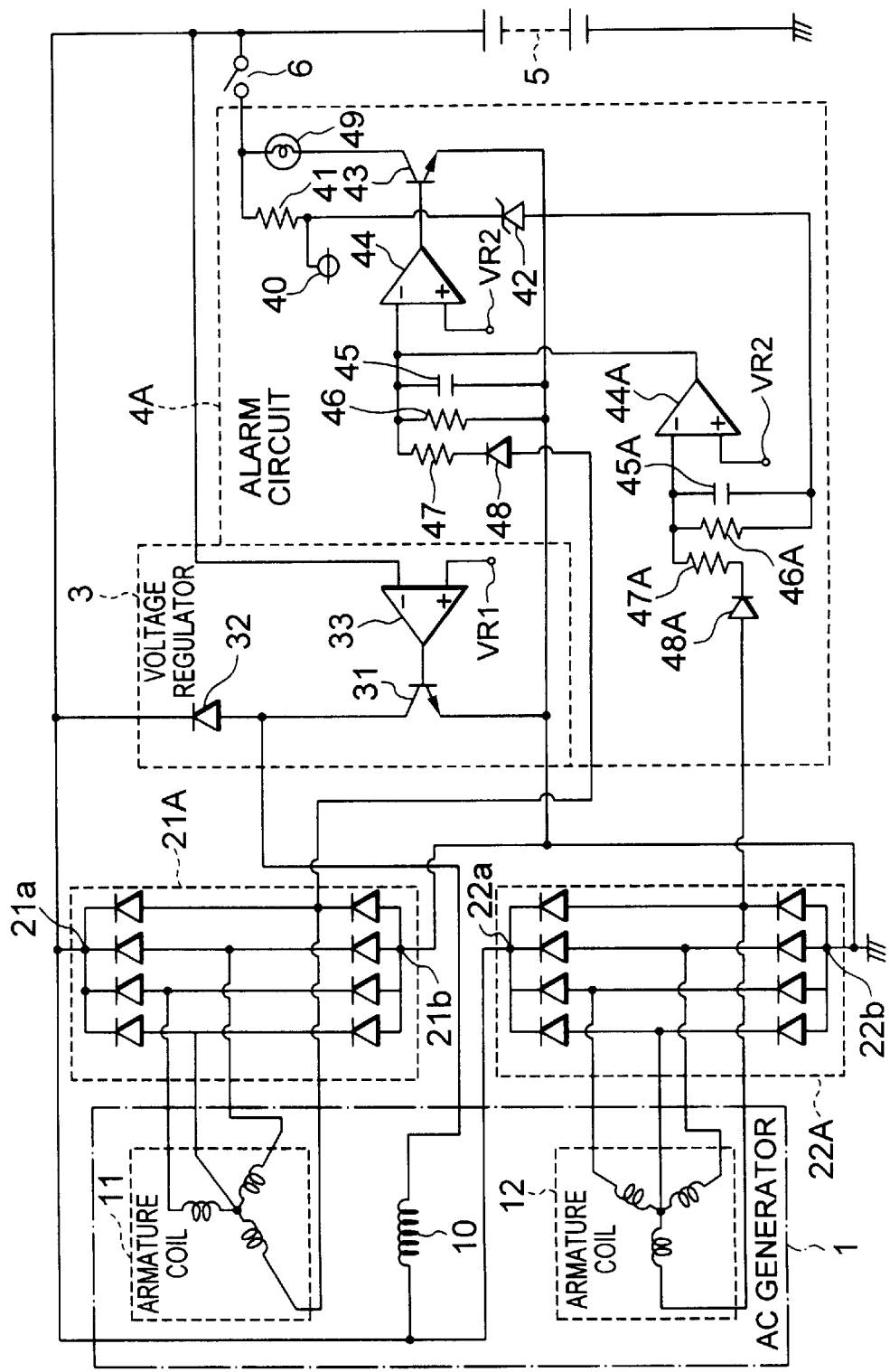
FIG. 2 is a circuit diagram showing a circuit configuration of an alarm apparatus for a vehicle-onboard AC generator according to a second embodiment of the present invention.

As can be seen in FIG. 2, each of the rectifier circuits 21A and 22A is additionally provided with a diode pair and thus composed of four diode pairs connected in parallel. The output voltage at each neutral point of the armature coils 11 and 12 is applied to a connecting point of the added diode pair.

In the alarm apparatus for the vehicle-onboard AC generator according to the second embodiment of the invention, the output voltage of the AC generator 1 is essentially same as in the case of the alarm apparatus (see FIG. 1). However, the number of the phases of the rectified output increases to four from three. Thus, the output current can be increased correspondingly.

Modifications

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the alarm apparatus according to the first embodiment of the invention, the output voltage of one phase is detected in each of the three-phase armature coils 11 and 12. It will however be understood that the arrangement for detecting the output voltage of the neutral point can be detected, substantially to the same effects as those mentioned previously.

Further, in the alarm apparatus according to the first embodiment of the invention, the rectifier circuits 21 and 22 are connected in parallel. However, the teaching of the present invention can equally be applied to the apparatus of such arrangement in which the rectifier circuits 21 and 22 are connected in series to each other for the purpose of rising or boosting the output voltage.

Further, in the alarm apparatus according to the first embodiment of the invention, phase difference of e.g. 30° in terms of electrical angle relative to the field coil 10 is set between the armature coils 11 and 12 with a view to suppressing the ripple components of the output voltage. However, it goes without saying that the teachings of the present invention can equally find application to the apparatus arranged such that the phase difference mentioned above is zero.

In the alarm apparatus according to the first embodiment, it has been described on the presumption that the alarm is generated upon detection of abnormal lowering of the generated voltage. However, it can readily be appreciated that such alarm may be generated when abnormal rising of the generated voltage is detected. To this end, the input polarities in each comparator 44; 44A of the alarm circuit 4A can be reversed, wherein the upper limit value of the output voltage is used as the comparison reference voltage for each comparator in place of the comparison reference voltage VR2 which corresponds to the lower limit value of the output voltage.

In the alarm apparatus according to the first embodiment of the invention, the alarm indicator lamp 49 is employed as the alarm means in the alarm circuit 4A. However, other types of alarm means such as a voice buzzer may equally be employed.

In the alarm apparatus according to the first embodiment of the invention, such arrangement is adopted for simplification of the circuit structure that the output of the comparator 44A is applied to the inversion input terminal (−) of the comparator 44. However, a pair of circuitries each similar to the comparator 44 may be provided in parallel. More specifically, the input polarities of the comparator 44A are reversed so as to be same as the input polarities of the comparator 44, and an alarm output transistor (not shown) similar to the alarm output transistor 43 may be connected to the output terminal of the comparator 44A in parallel, wherein the alarm output transistor (not shown) may be connected to the alarm indicator lamp 49.

Accordingly, all suitable modifications and equivalents may be resorted to, falling within the spirit and scope of the invention.

What is claimed is:

1. An alarm apparatus for a vehicle-onboard AC generator, comprising:
    an AC generator driven by an engine of a motor vehicle and including a field coil and a pair of armature coils;
    a pair of rectifier circuits for rectifying output voltages generated by said paired armature coils, respectively;
    a battery charged by rectified outputs of said paired rectifier circuits;
    a voltage regulator for regulating the output voltages of said paired armature coils on the basis of either rectified output voltages of said rectifier circuits or a terminal voltage of said battery; and
    alarm means for generating an alarm when at least one of the output voltages of said paired armature coils deviates from a predetermined value.

2. An alarm apparatus for a vehicle-onboard AC generator according to claim 1,
    wherein said alarm means sets a lower limit value of voltage generated by said AC generator as said predetermined value, and
    wherein an alarm is generated when at least one of the output voltages of said paired armature coils becomes lower than said lower limit value inclusive.

3. An alarm apparatus for a vehicle-onboard AC generator according to claim 1,
    wherein said alarm means includes:
        a pair of comparators for comparing the output voltages of said paired armature coils, respectively, with said predetermined value; and
        an alarm indicator lamp actuated in dependence on a comparison output of at least one of said paired comparators.

4. An alarm apparatus for a vehicle-onboard AC generator according to claim 3,
    wherein the output voltage of one of said paired armature coils is applied to an inversion input terminal of one of said paired comparators,
    while the output voltage of the other one of said paired armature coils is applied to a non-inversion input terminal of the other one of said paired comparators, and
    wherein the output voltage of said other comparator is applied to the inversion input terminal of said one comparator.

5. An alarm apparatus for a vehicle-onboard AC generator according to claim 3,
    wherein said paired comparators compare one-phase output voltages of said paired armature coils, respectively, with said predetermined value.

6. An alarm apparatus for a vehicle-onboard AC generator according to claim 3,
    wherein said paired comparators compares output voltages at neutral points of said paired armature coils, respectively, with said predetermined value.

7. An alarm apparatus for a vehicle-onboard AC generator according to claim 1,
    wherein said paired rectifier circuits are connected in parallel to each other.

8. An alarm apparatus for a vehicle-onboard AC generator according to claim 1,
    wherein said paired rectifier circuits are connected in series to each other.

9. An alarm apparatus for a vehicle-onboard AC generator according to claim 1,
    wherein said paired armature coils are set to a same phase in terms of an electrical angle.

10. An alarm apparatus for a vehicle-onboard AC generator according to claim 1,
    wherein a predetermined phase difference is set between said paired armature coils in terms of an electrical angle.

* * * * *